March 15, 1966  G. A. WISWELL  3,240,132
REFLECTIVE AND RETRO-REFLECTIVE TRAFFIC MARKER
Filed Oct. 31, 1963  5 Sheets-Sheet 1
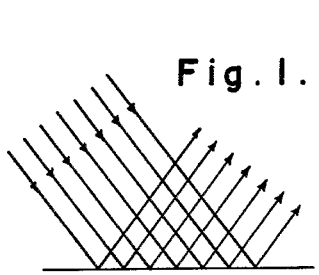
Fig. 1.
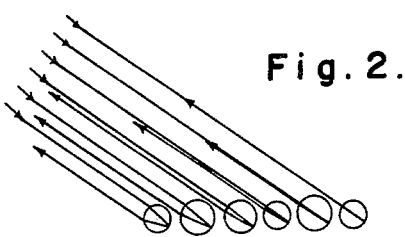
Fig. 2.
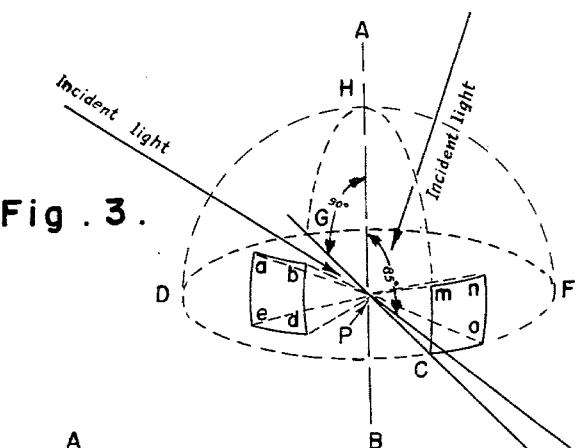
Fig. 3.
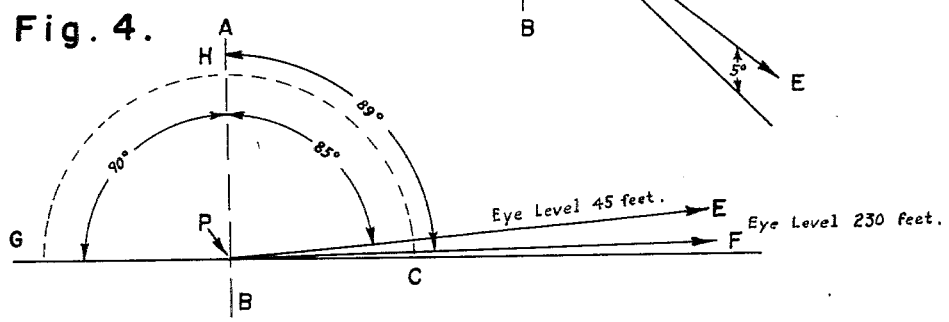
Fig. 4.
Fig. 5.
Fig. 5A.
Fig. 5B.
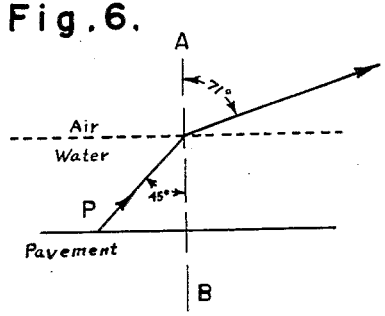
Fig. 6.
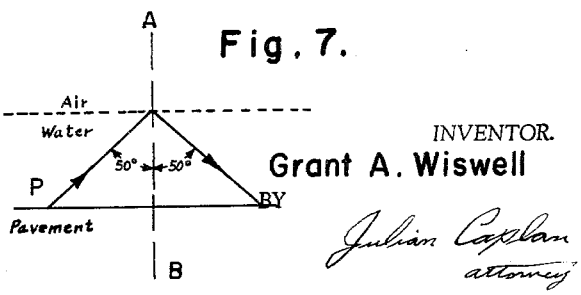
Fig. 7.
INVENTOR.
Grant A. Wiswell
BY
Julian Caplan
attorney

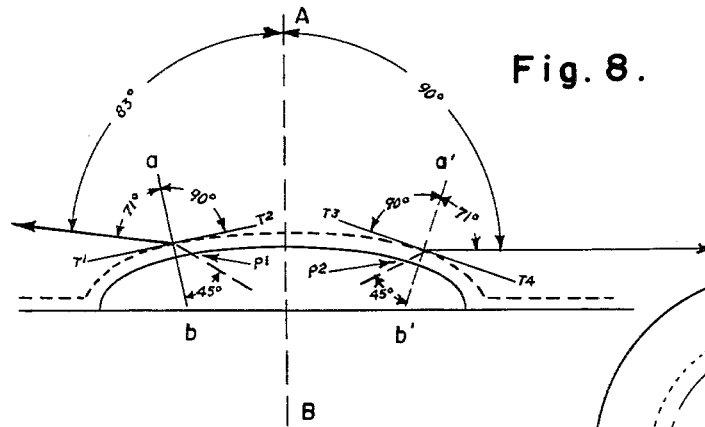
Fig. 8.
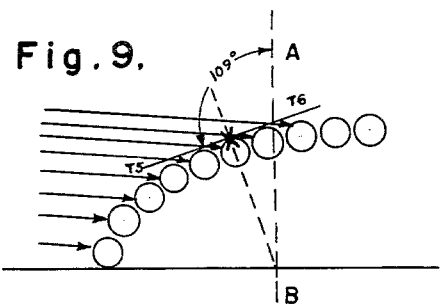
Fig. 9.
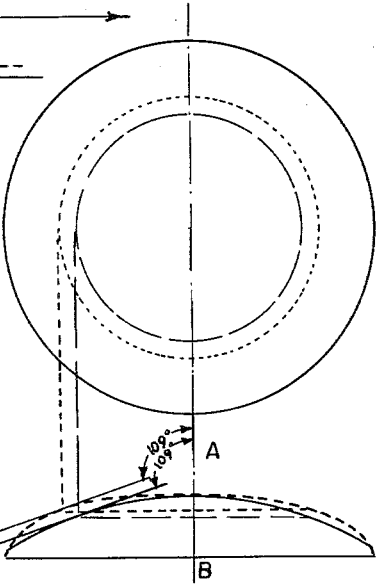
Fig. 10.
Fig. 10A.
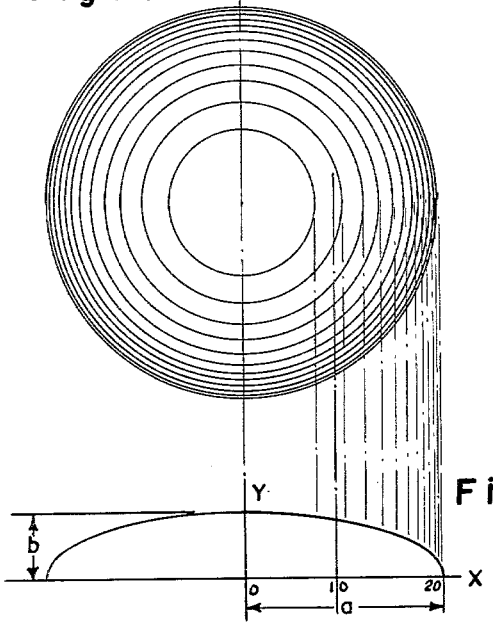
Fig. 11.
Fig. 11A.
INVENTOR.
Grant A. Wiswell March 15, 1966  G. A. WISWELL  3,240,132
REFLECTIVE AND RETRO-REFLECTIVE TRAFFIC MARKER
Filed Oct. 31, 1963  5 Sheets-Sheet 3
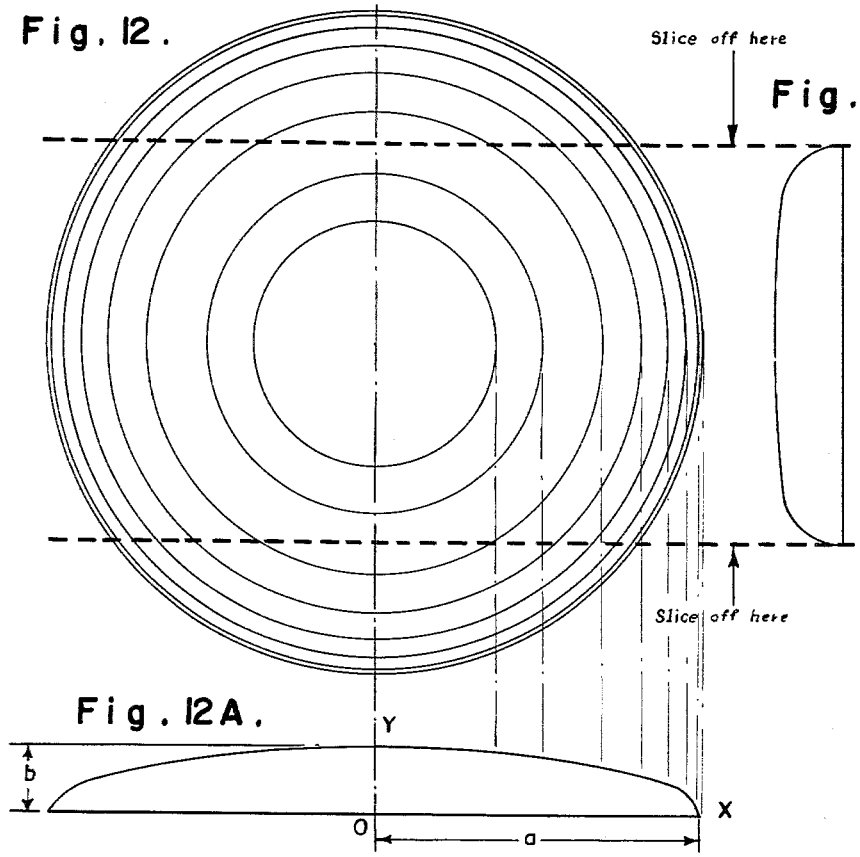
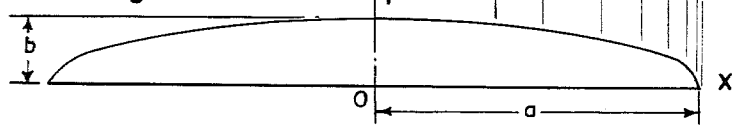
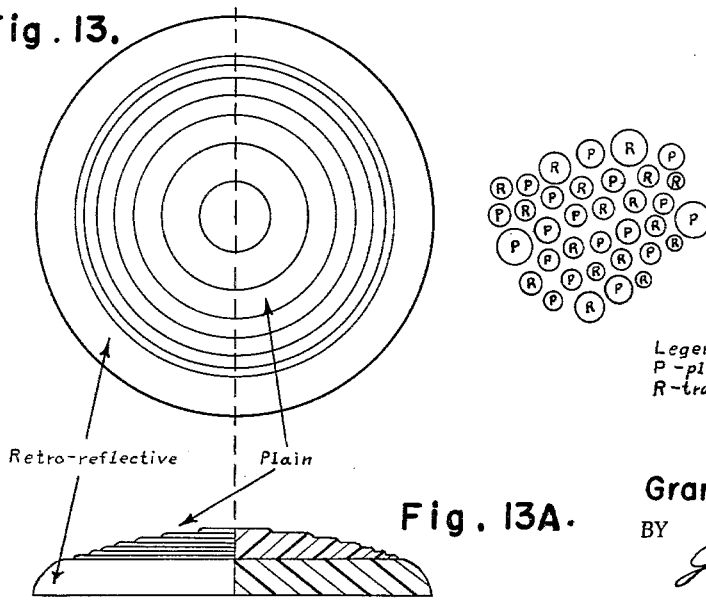
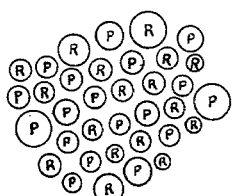
Legend:
P – plain, opaque
R – transparent, retro-reflective
INVENTOR.
Grant A. Wiswell
BY March 15, 1966  G. A. WISWELL  3,240,132
REFLECTIVE AND RETRO-REFLECTIVE TRAFFIC MARKER
Filed Oct. 31, 1963  5 Sheets-Sheet 4

INVENTOR.
Grant A. Wiswell
BY

March 15, 1966   G. A. WISWELL   3,240,132
REFLECTIVE AND RETRO-REFLECTIVE TRAFFIC MARKER
Filed Oct. 31, 1963   5 Sheets-Sheet 5

INVENTOR.
Grant A. Wiswell
BY Julian Caplan
    Attorney

United States Patent Office 3,240,132
Patented Mar. 15, 1966

3,240,132
REFLECTIVE AND RETRO-REFLECTIVE
TRAFFIC MARKER
Grant A. Wiswell, Palo Alto, Calif.
(% Botts-Line Inc., 2431 Spring St., Redwood City, Calif.)
Filed Oct. 31, 1963, Ser. No. 320,466
6 Claims. (Cl. 94—1.5)

This invention relates to a new and improved reflective and retro-reflective traffic marker. Reference is made to copending patent application, Serial No. 135,668 filed September 1, 1961, for "Traffic Marker and Method of Producing Same," of which the present application is a continuation-in-part.

The present invention provides a traffic marker to delineate traffic lines, center lines, and the like. In one form of the invention, the marker is wedge-shaped in side elevation. Where the marker is used to delineate center lines, where traffic is approaching from opposite directions, the wedge is double, having a transverse medial crest. Where, however, the marker is intended primarily to delineate traffic lanes where the traffic is moving in a single direction, a single wedge is employed. A wedge or slanted surface is visible to the driver of an approaching automobile at a distance, the slope of the slanted surface being approximately 10 degrees which provides a sharp delineation from the pavement or paint stripes on the pavement.

A particular feature and advantage of the present invention is the fact that it is highly visible in dry or wet weather under daylight or artificial lights and where the light is artificial, whether such light be from overhead lighting or the head-lights of approaching automobiles. For such purpose, in a preferred form of the invention, the marker is formed in two layers. The base is formed of a plastic material which is loaded with retro-reflective glass beads which reflect back to approaching automobiles the light of headlights. The crown or top of the markers is dense and highly reflective and does not contain glass beads. The top of the marker reflects natural and artificial light from overhead sources in all directions, particularly toward the approaching vehicle. This reflective effect is augmented by a pattern of indentations or ridges in the top surface of the reflective top portion which provides a plurality of reflective surfaces more vertically disposed than the sides of the marker and thus more effective in reflecting light to automobiles. The top of the marker is preferably elliptical, rather than flat, both in side and in end elevation and hence the top of the marker is visible from the sides and either end to a certain extent, which feature likewise improves visibility of a marker along one side of a traffic lane in which the vehicle is located. Substantially vertical edges are formed along the sides of the marker, which makes the marker visible from either side.

The lower portion of the marker is loaded with retro-reflective glass beads which reflect the headlights of the automobile back to the eyes of the driver. Where a wedge shape is used, the slanted surface tends to reflect more effectively than a flat or spherical surface.

The marker is formed of a tough plastic which is affixed to the pavement by a suitable adhesive. Preferably, the markers are affixed in a straight line in a pattern, such as an interrupted line. The markers are visible from a considerable distance extending on into the horizon.

The marker has many advantages, of which the following are of particular significance:

(a) Provides optimum visibility under all lighting conditions, whether daylight, artificial light from fixed sources adjacent to roadways or from moving sources such as car headlights, such visibility being effective day and night and regardless of weather.

(b) Is sturdy enough to withstand the severe service of heavy automobile and truck traffic for many years.

(c) Can be produced at low cost and installed at low cost.

(d) Notifies car drivers, by rumbles or bumps, that a car wheel is beginning to cross into another or the wrong lane, or right of way.

(e) Does not present an obstruction or skid-promoting shape on the road.

Road markers have been installed on streets and highways which give fair to good reflectivity at night, but which are relatively unnoticeable in the daytime. Others show up well in good daylight, but do not do so in bad weather or at night. Furthermore, some markers will do a fair job of delineating at night when lighted by headlights, but a poor job when the same markers are installed where there is overhead street or freeway lighting. Since lighted intersections and freeway interchanges, involving numerous lanes of fast-moving traffic, must have the best possible delineation of lanes, gores, islands, bend-outs, etc., a good day or night, fair weather or foul weather type of marker is badly needed. This is provided by the present invention.

To understand the advantages provided by the invention, some facts concerning reflectivity of road and street marking and their effectiveness in providing good visibility to drivers should be kept in mind. Although fundamental, and in some respects quite elementary, some characteristics of traffic marking and visual apprehension related thereto are as follows:

(1) For utmost safety to drivers, the delineation of lane separation, obstructions, bend-outs or curves should be visible to the driver so far in advance of the position of the vehicle as to permit him to alter the vehicle's speed or direction, without abrupt change, so that he may change lanes or safely maneuver without conflict with other vehicles.

(2) In dry, daytime driving, a well-painted traffic stripe is usually adequate for delineation and channelizing; however, even good paint does not deter so-called "lane line riders" from unintentionally crowding in upon cars in adjoining lanes.

(3) When roadways become rain swept, traffic paint tends to disappear completely as a film of water forms, and all delination is lost; furthermore, some types of paint actually become hazardous by providing a smooth base upon which water, plus oil particles and dirt, becomes a lubircant, thus promoting loss of wheel traction and skidding.

(4) Three dimensional, high visibility traffic delineation is being sought by traffic engineers, generally, and a number of devices are on the market. Various traffic buttons are being offered for lane separators, and cast, elongated pyramids, called "raised bars," are used extensively for channelizing.

(5) Traffic buttons on freeways are intended to replace painted white striping. On some locations the buttons are reflectorized, that is, glass spheres are imbedded in the body of the markers and are exposed at the surface to provide retro-reflection of light from car headlights. On some locations the traffic buttons are a solid white color, providing *reflectivity* only, day or night, as from a painted surface. It is observed that the glass spere type of buttons is very bright at night, but tends to appear gray under overhead lighting or sky light. On the contrary, solid white buttons provide very good delineation under overhead lighting or sky light, but tend to appear gray in front of car headlights. Either type, in day or night driving, provides the three dimension marker desired by traffic engineers, and both are recognized as doing a much better job than afforded by traffic paint.

(6) The visibility of plain white, non-reflectorized markers, in the daytime, is a function of the amount of incident light they reflect in the form of a spheroid—that is, the marker is equally visible from any direction or aspect above the surface. At night, such non-reflectorized markers attain their relative visibility from the light falling upon them, whether overhead lighting or headlights; their visibility is from the light they reflect, in general, over a spheroid pattern. Their effectiveness also depends to a degree upon the contrast in color they produce against their background. Also, since they are reflecting the light failing upon them, they appear brightest when the viewer is nearest them and dissolve into the background at a distance due to the fact that the intensity of the light they are reflecting varies inversely with respect to the distance.

(7) Light reflected from reflectorized markers (glass beads exposed) is returned in more or less the same direction from which the light originated (retro-reflection) and is collimated to a considerable degree. Car headlights are reflected back to the driver with considerable intensity (depending upon the strength of the driver's headlights) over considerable distances and, since the reflected light is more or less a beam of parallel light rays, the distance is not so much inversely related to the efficiency of the reflected light as is the case with markers which are not reflectorized. It is noted, too, that light falling upon reflectorized markers from sky or overhead lighting, no matter how intense, is reflected back toward its sources, and not toward the driver of a car unless, of course, the light source is immediately in front of the driver (as is the case with headlights) or somewhat immediately behind the driver.

(8) Summarizing points 6 and 7 above, an ideal traffic button would be highly retro-reflective for night drivers and highly reflective for overhead lighted locations or in daytime, but the laws of physical science deny this dual characteristic. A preferred form of the present invention combines in one marker an area which is retro-reflective and an area which is highly reflective. Since compromise or division usually entails a giving up of some values on both characteristics, it is interesting to note that due to the psychological nature of human sight sense this invention results in a marker which does not yield very much from optimum nighttime and daytime effectiveness.

The marker previously described may be produced in several ways. One of the features of the present invention is an improved method of producing the marker which affords numerous advantages, among which are a saving in cost of production thereof, close control of the steps of the method which is made possible by the practice thereof, and the adaptability of the method to the manufacture of markers of different visual characteristics in mass production.

Other objects of the present invention will become apparent upon reading the following specification and referring to the accompanying drawings in which similar characters of reference represent corresponding parts in each of the several views.

In the drawings:

FIGS. 1 to 4, inclusive, are schematic views illustrating principles of emission and reflection of light applicable to the present invention as hereinafter set forth.

FIG. 5 is a plan view of a painted traffic stripe.

FIG. 5A is a side elevation thereof, showing schematically said stripe viewed from a side at eye level at a distance.

FIG. 5B is an end view thereof, as viewed from the end at eye level at a distance.

FIGS. 6 to 9, inclusive, are further schematic views illustrating optical principles in connection with the present invention.

FIG. 10 is a plan view of a traffic marker showing in solid lines the optical effects resulting from a spherical shape, and in dotted line effects resulting from an elliptical shape.

FIG. 10A is a front elevational view thereof.

FIG. 11 is a top plan of a button in accordance with the present invention.

FIG. 11A is a front elevation thereof.

FIG. 12 is a plan view showing the elliptical form of a marker according to the present invention with horizontal dotted lines indicating the slicing of a round marker to produce the rectangular plan shape of the present invention.

FIG. 12A is a front elevation thereof.

FIG. 12B is an end view of the wedge sliced as above indicated.

FIG. 13 is a top plan view of a round button, in accordance with the present invention.

FIG. 14A is a front elevational view thereof, partly broken away in section.

FIG. 14 is a schematic view showing plain and retro-reflective glass beads of different diameters.

Figure 15:
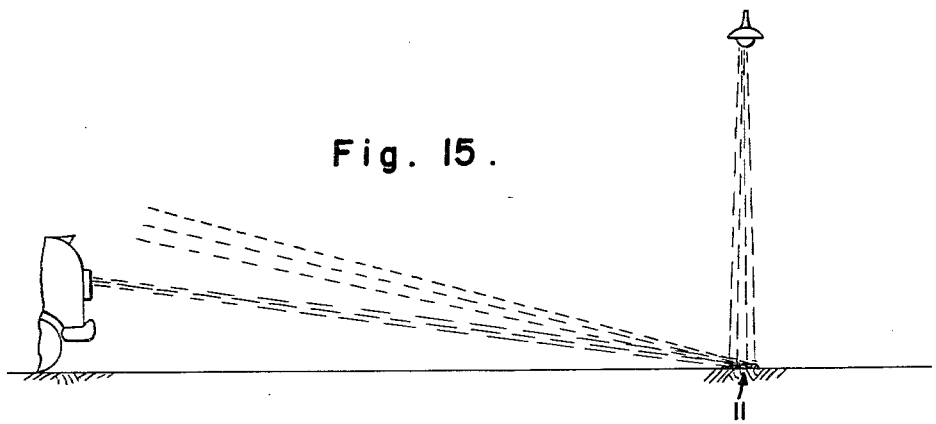

FIG. 15 is a perspective view showing a traffic marker of single wedge shape subjected both to overhead light and the light of the headlights of an approaching vehicle.

Figure 16:
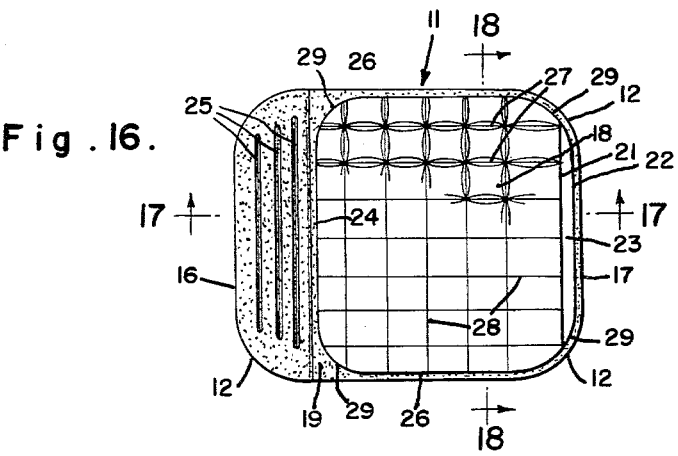

FIG. 16 is an enlarged plan view thereof.

Figure 17:
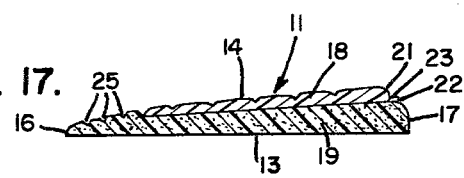

FIG. 17 is a sectional view taken substantially along line 17—17 of FIG. 16.

Figure 18:
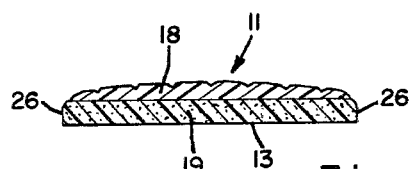

FIG. 18 is a transverse sectional view taken substantially along the line 18—18 of FIG. 16.

Figure 19:
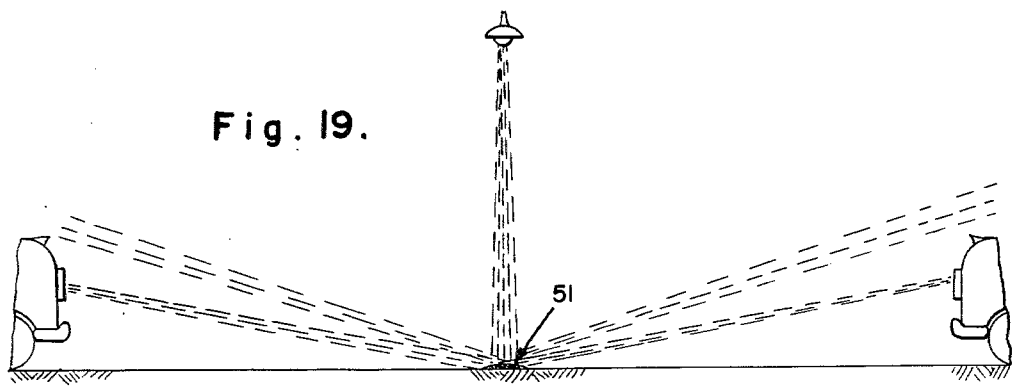

FIG. 19 is a view similar to FIG. 15 of a double wedge shape marker.

Figure 20:
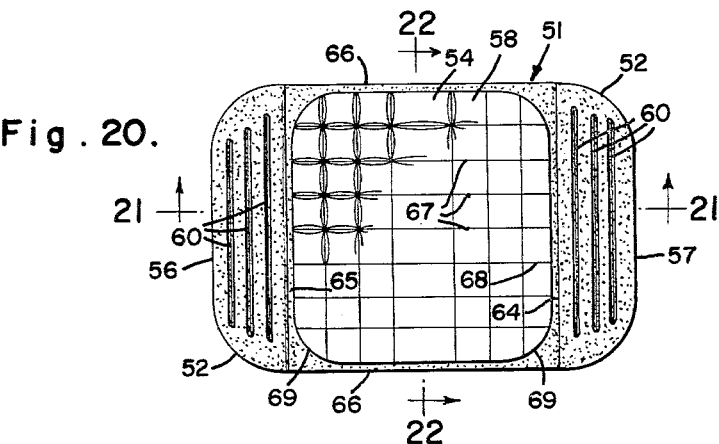

FIG. 20 is a top plan view of the double wedge of FIG. 19.

Figure 21:
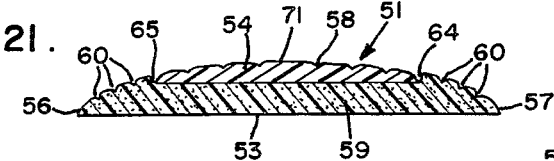

FIG. 21 is a sectional view taken substantially along the line 21—21 of FIG. 20.

Figure 22:
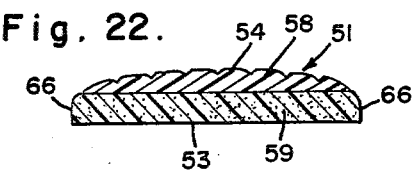

FIG. 22 is a transverse sectional view taken substantially along the line 22—22 of FIG. 20.

Figure 23:
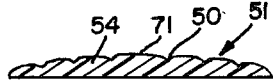

FIG. 23 is a longitudinal sectional view of a further modified wedge.

Figure 24:

FIG. 24 is a transverse sectional view of the modification of FIG. 23.

At the outset, reference will be made to certain principles of light reflection which are important to an understanding of the present invention.

FIG. 1 shows a beam of collimated light falling upon a smooth or glossy surface. Note that each individual ray is reflected at an angle to the perpendicular equal to the angle of incidence. If diffused light (such as skylight on a cloudy day, or artificial illumination from many sources) falls upon such a surface, then the reflected light would also be diffused, since each ray follows the law that the angle of reflection is equal to the angle of incidence.

FIG. 2 shows a beam of light falling upon a surface composed of transparent glass spheres. Note that the individual rays are returned by refraction and reflection in the general direction of the source of the light. If the incident light were from many sources (diffused) then the rays would be returned as diffused, giving the retro-reflective surface a gray appearance. If the spheres were on a raised form or on a perpendicular wall, light rays would still be traveling back toward their source.

When incident light is collimated as from sun or headlights, or from a single source, and falls upon a horizontal surface at a low angle (89° to 75° from perpendicular) there is very little scattering, as shown in FIG. 3, since the surface reflects most of the light at close to the angle of incidence, even if the surface is "flat"—i.e., not glossy. When a "flat" finish is a curved surface, an observer sees such reflected light as high lights.

FIG. 3 illustrates the distribution of light from a point, shown as P, which is illuminated by means of incident light shown and which then reflects the light in all directions in a semi-spherical pattern. The figure diagrams a semisphere in which are shown two "windows"—a, b, d, e and m, n, o, C. It should be noted that the two "windows" are of equal area; thus the amount of light passing through one window is equal to the amount of light passing through the other, and if the entire surface of the diagrammatic semisphere were divided into windows of equal area to those drawn, then each such window would enscribe an equal amount of passing light known as "luminous flux." It should further be noted that the strength of the reflected light varies inversely as the square of its distance from point P.

From point P and on the plane G–H–C in FIG. 3 is shown a reflected beam of light P–E which is 85° from perpendicular (5° from horizontal). FIG. 4 shows the plane G–H–C of FIG. 3 in side elevation with light beam P–E being reflected from point P at an angle of 85° from perpendicular and below that another reflected beam P–F at 89° from perpendicular. Note that an observer at a distance of 45 feet would see point P, along P–E, and another observer at 230 feet would see point P by the beam P–F (1° above horizontal). A table of these sight distances is important to the subject, as it is noted that:

When line of sight is 86° from perpendicular, observer is 57 feet from point P;

When line of sight is 87° from perpendicular, observer is 76 feet from point P;

When line of sight is 88° from perpendicular, observer is 114 feet from point P.

All of the above sight distances are from an observation point four feet above horizontal base, this being the average height of a passenger car driver's eyes above the pavement.

For practical purposes, a traffic line or legend as close to an approaching car as 48 feet is seen too late for a driver to react to guidance or regulator markings unless he is proceeding at very low velocity. At a speed of 60 m.p.h., a driver's closure is at the rate of 88 feet per second; thus he is about 250 feet (three seconds time) from legends he is observing at an angle of about 89° from perpendicular. We must conclude that the minimum sight distance for effective pavement marking is more than 45 feet for a moving vehicle and probably closer to 230 feet, since a perfectly horizontal plane is not usual in highways or streets, in any case. Therefore, we shall use a line of sight of 89° from perpendicular (P–F on FIG. 4) as minimum for safe marking distance considerations.

It is important to note here that of all the luminous flux from point P, an observer at the several locations referred to above will see only the minute portion of that flux which comes to his eyes at the very low angles shown.

FIG. 5 shows a traffic stripe 9 feet long by 4 inches wide, a size commonly used in traffic lines of paint or thermoplastic material where a pattern of dashes is employed for lane dividers. Note that the stripe has 432 square inches fully exposed to overhead illumination from sun, skylight or overhead lights. While an observer at 4 feet above ground level sees only a minute part of the light being reflected from each "point P," as shown in FIGS. 3 and 4, there are billions of such points in the 432 sq. in. shown which the observer sees concentrated in beams through a "window" approximately 4″ wide and 2″ high (see "End View" in FIG. 5). Thus the effectiveness of traffic paint.

FIG. 6 shows the effect of a film of water over a point P which is reflecting incident light. Note that a light ray from P, traveling at an angle of 45° to the perpendicular A–B of the water-air boundary is bent by refraction and emerges from the water surface at an angle of about 71° from perpendicular A–B. Such a point would not be seen by an observer whose eyes are four feet above the ground at a distance of 48 or more feet from point P, based on conclusions reached hereinbefore.

FIG. 7 shows a ray of light from point P which is 50° from A–B, the perpendicular to the water surface. This ray cannot emerge from the film due to the fact that it strikes the boundary of the water-air film at more than the critical angle of incidence for water, which is about 49° from perpendicular.

Since an observer 230 feet from a paintd traffic stripe (at four foot eye level) would see only such light rays as merge from the water film at 89° from perpendicular, the equation for light traveling from water to air should be noted.

The equation:

Index of refraction $$= \frac{\text{sine of angle in air}}{\text{sine of angle in water}}$$

1.333 (Index of refraction for water)

$$= \frac{.9998 \text{ (sine of } 89°)}{\text{sine of angle in water}}$$

$$.7500 = \text{sine } 48°34' = \frac{.9998}{1.333} = .7500$$

The angle 48°35′ is almost the critical angle of incidence and any reflected light which might emerge would be of insignificant strength. Furthermore, the angle relationships shown in FIGS. 6 and 7 and above are for still and unrippled water film. In usual rain circumstances there are numerous factors causing tubulence or rippling of water film—splash from cars, wind, texture of road surface, etc. Also, light conditions are at their worst during rain, particularly at night when headlights of approaching cars compound all other adverse driving conditions.

In FIG. 8, light being reflected from point $p^1$ approaches the water-air boundary at an angle of 45° to $a$–$b$, the perpendicular to the tangent $T^1$–$T^2$ and emerges from the water film at an angle of 71° from the perpendicular to tangent $T^1$–$T^2$. This emerging angle, however, is about 83° from the general perpendicular A–B and thus out of sight to an observation point four feet above the road surface and 48 or more feet from the marker Again in FIG. 8, light being reflected from point $p^2$ and approaching the water film at 45° emerges from the film at an angle of 71° from $a^1$–$b^1$, the perpendicular to the tangent $T^3$–$T^4$ which is about 90° from the general perpendicular A–B. Thus point $p^2$ could be seen by an observer at any distance from the pavement marker, assuming the strength of light was adequate.

From FIG. 8, we can draw a general conclusion that a surface covered by a water film and in which a tangent drawn thereto makes an angle to the general perpendicular A–B of 109° or more can be visible at reasonable distances, whereas surfaces under water film whose tangency to the general perpendicular is less than 109°, are invisible under average conditions.

It will be noted in FIG. 8 that the top area (that between $p^1$ and $p^2$) is ineffective when covered by a film of water inasmuch as light being reflected from any point in the area will not "bend" to an observer who is 48 or more feet distant.

FIG. 2 shows in side elevation the retro-reflectivity of a horizontal area of transparent glass spheres. FIG. 9 shows spheres on a curved surface and it will be noted that the efficiency of the surface is a function of the area of spheres upon which the light beam falls. The most efficient surface, when headlight beams and driver's line of sight are about 89° from perpendicular, would be one perpendicular to the road surface (0° from perpendicular) and efficiency diminishes as the inclination of the surface diminishes due to the fact that the light beam reaches only the tops of spheres which are on a horizontal or nearly horizontal plane.

In FIG. 9 the tangent $T^5$ and $T^6$ is approximately at the point (X) which separates the relative efficiency of the more perpendicular surface from the less efficient top surface of the form shown. It should be noted that this tangent is about 109° from the general perpendicular A, B. It should be further noted that if this form were covered by a film of water the light beams from angles near the horizontal (85° and more from perpendicular) would not be reflected from water film above point X due to phenomena described in the foregoing.

FIG. 10 shows two forms of revolution, one dotted outline with an elliptical cross section and the other with a spherical cross section. Tangents which are 109° from perpendicular are shown for each outline and it should be noted that the elliptical form has a larger area of cross section in the more efficient planes which have greater than 109° tangency to the general perpendicular A, B. Furthermore, the elliptical cross section presents a better target or a broader object-in-view than the spherical segment of the same base width and height. At low angles of sight objects which "feather" into the base, a characteristic of the spherical segment type of button tend to lose crispness of definition. Sharp points on objects become blurred at a distance as can be observed by any person viewing a saw blade at 10-15 feet. The points disappear into a "soft" diffused margin.

Compared to the spherical segment the elliptical cross-section provides a larger area over the top, where tangency to the general perpendicular A, B (see FIG. 10) is less than 109°. This area is highly efficient under overhead lighting and in daytime under dry weather conditions if the surface is plain (not retro-reflective). This area can be made highly efficient for general rain conditions, whether the surface is reflective or retro-reflective as will be noted hereinafter.

Taking into consideration all requirements for a durable and highly visible traffic marker, we arrive at a surface of revolution (FIG. 11) as being most practical, with the cross-section being an ellipse drawn to the equation.

$$\frac{x^2}{a^2}+\frac{y^2}{b^2}=1$$

in which $b$ is the maximum height and $a$ is one-half the diameter chosen for construction. Street and highway engineering standards limit the height of various types of raised markers and, in the case of lane markers, usually specify close to a 4″ width to be about equal to the width of a traffic strip. FIG. 11 shows the development of the design of a traffic button 0.700 inch high and 4.20″ in diameter. Thus $a$ is 2.100 inches and $b$ is 0.700 inch. The graph of the following equation is shown in the following table:

Equation:

$$\frac{x^2}{a^2}+\frac{y^2}{b^2}=1$$

When:

$$a=21,\ b=7$$

Then:

$$\frac{x^2}{21^2}=\frac{7^2-y^2}{7^2}$$

$$\frac{x}{21}=\frac{\sqrt{49-y^2}}{7}$$

$$x=3\sqrt{49-y^2}$$

TABLE

| Y | X |
|---|---|
| 1 | 20.784 |
| 2 | 20.124 |
| 3 | 18.975 |
| 4 | 17.235 |
| 5 | 14.697 |
| 6 | 10.815 |
| 6.5 | 7.794 |
| 7 | 0 |

To further utilize the advantages of the elliptical cross-section on the top area of the marker, where tangency to the perpendicular is less than 109°, we construct a multiplicity of small mounds or concentric rings, each of which presents to the observer surfaces whose tangency to the perpendicular exceeds 109°, as much as possible. (See FIGS. 12, 13.) The top surface, therefore, is made more effective for rain conditions whether the surface is reflective or retro-reflective and at the same time there is little, if any, loss of dry weather characteristics. As a matter of fact, under light conditions where the top surface reflects high lights, there appears a number of smaller highlights. Furthermore, the small mounds or rings tend to part rain film over the tops of the small convolutions by surface attraction from the film to the "valleys," so that much area on the marker top may be dry even though there is general water film elsewhere.

There are environments where engineers want more plain surfaces on the marker tops than offered by a button shape and a wedge shape of marker may be required. A preferred design of wedge results from the use of the elliptical equation as shown in FIG. 12. In this case, a two-way wedge is required, 7 to 8 inches long and 4.200″ wide, 0.700″ high. Accordingly, a cross-section is drawn where $b$ equals 0.700 inch and $a$ equals 4.200 inches. A disc to these dimensions is turned on a lathe. After turning, two sides of the resultant disc are sliced off and the square sides taken down to a radius, so as not to have undesirable sharp margins on the markers. Another procedure for developing the rectangular shaped wedge comprises providing as a pattern a rectangular block 4″ x 8″ x 0.700″ planed off longitudinally to the equation in FIG. 11 (across the 4″ width) and planed laterally to the equation of FIG. 12. The top ridges are smoothed out. This equation and table derived therefrom are as follows:

Equation:

$$\frac{x^2}{a^2}+\frac{y^2}{b^2}=1$$

When:

$$a=35,\ b=7$$

TABLE

| Y | X |
|---|---|
| 1 | 34.640 |
| 2 | 33.540 |
| 3 | 31.625 |
| 4 | 28.725 |
| 5 | 24.495 |
| 6 | 18.025 |
| 6.5 | 12.990 |
| 7 | 0 |

In all of the shapes shown, the top surfaces are improved by carving shallow grooves to create small mounds, knobs or concentric rings.

In all of the two-finish markers heretofore shown, plain and retro-reflective surfaces are of substantial area related to the size of the markers. Since we are in the matter of reflectivity and retro-reflectivity dealing with light rays which are sub-microscopically small, we show in FIG. 14 an effective alternate method of providing plain and retro-reflective areas by using transparent glass spheres mixed with opaque white or yellow granules or spheres of glass, porcelain or white or yellow sand. In such a marker the engineer has a choice as to percentages of total area he desires in plain and in retro-reflective surfaces by specifying, for example, 50% plain and 50% retro-reflective, as in FIG. 14 or some other proportion. When the opaque granules or spheres used are very small (20–100 microns diameter) and the transparent glass spheres are 10 to 20 times as large (400 to 1200 microns diameter) the large spheres may be exposed to almost one-half their diameter resulting in a very effective surface for excellent daytime or night-time visibility. The transparent (retro-reflective) spheres become "islands" set in an opaque base of plain white, yellow or other selected color for plain reflective surface for daytime effectiveness.

FIGS. 15 to 22 show two preferred shapes of the marker, which is preferably made of plastic by a method hereinafter described.

The resin is a polyester having a viscosity at 77° F. Brookfield of 600–900 cps.; specific gravity 1.1 to 1.5; tensile strength 1200 to 1800 p.s.i.; Barcol hardness 0; Shore D hardness 71 to 78.

Directing attention first to FIGS. 15 to 18, inclusive, in top plan view the marker 11 is substantially rectangular with rounded corners 12. The bottom 13 of the marker is flat, rough and granular for good adherence to the pavement. The granular bottom surface is created by sifting small glass beads, silica or the like on the uncured surface. In addition to improving the bond when applied to the pavement, application of the beads improves the curing of the plastic and results in additional improvement of the bond. Viewed in side elevation, the marker is a truncated wedge with an elliptical top surface 14, a flat bottom 13 surface (which is affixed to the pavement) and a substantially vertical shoulder 16, 17 at either end. The upper part 18 of the marker is of a highly reflective substance, hereinafter described in detail, while the bottom 19 of the marker is retro-reflective.

The formula for retro-reflective section 19 is polyester resin content 18% by weight, glass spheres 70% and 5% (either titanium dioxide or chrome yellow pigment).

For the high gloss section 19 the resin content is 30%, inert fillers 45% and pigment 21%.

The glass spheres are 75% minimum true spheres, with an index of refraction of 1.5 minimum. Adjacent the thicker end 17, two cuts 21, 22 are formed in the reflective portion providing vertical reflective surfaces and, also, a flat horizontal surface 23 in the extreme forward end of the reflective portion 18. A groove 24 is formed in the retro-reflective portion at the forward edge thereof where it meets the retro-reflective material 19 as a parting line between reflective and retro-reflective portions. Three transverse grooves 25 are formed in the ramp portion of the retro-reflective section to improve visibility.

In end elevation the top 14 is likewise elliptical and the sides 26 substantially vertical so that the outer edges 26 of the reflective portion may be seen from either side of the marker.

The one-way markers 11 have a length of five inches and a width of four inches and corner radius of one inch. The glossy surface 18 is about 3.75 inches long. The rounded corners 29 of the glossy part are of a radius of .875 inch. The height of the wedge at crest 31 is .625 inch.

A pattern of reticulated longitudinal and transverse V-shaped indented lines 27, 28, or grooves about .030" deep are formed in the reflective material 18 rearward of cuts 21, 22 in a so-called waffle pattern. Such pattern provides a plurality of more or less vertical surfaces which reflect overhead natural artificial light in all directions.

In addition to providing for light reflection as heretofore described, the marker 11 further, by reason of its being slanted toward the approaching line of traffic, is more highly visible from the driver's eye level.

The marker 11 also provides a raised surface having steep side edges 26, so that when the tires of a vehicle pass over a noise or rumble is produced and hence the driver is warned that he is crossing a lane. The curve top surface 14 of the marker, although such as to produce a noise audible to the driver, is not such that it causes the wheels of the vehicle to skid when they come in contact therewith.

The markers are preferably applied to the pavement in a line spaced apart at intervals, said line being interrupted when crossing one lane to the other is permissible.

The chemical properties of the marker are hereinafter described in detail. However, the marker is a hard, lightweight plastic material which will withstand the impact of heavy traffic.

Directing attention now to the form of the invention shown in FIGS. 19 to 22, inclusive, a double wedge form 51 is provided. Viewed in plan as in FIG. 20, the marker is rectangular with rounded corners 52, being more elongated than the form shown in FIG. 16, but of substantially the same width. Viewed in side elevation, the bottom 53 of the marker is flat but rough and granular for optimum contact with the surface of the roadway to which it is applied. The top surface 54 is elliptical reaching a maximum elevation 71 at the center of the marker and sloping toward either end. The ends 56, 57 of the marker are truncated and vertical, as are side edges 66.

In end elevation the top surface 54 of the marker is likewise elliptical with substantially vertical shoulders 66, with a slight rounding at the juncture of the flange and the top surface.

A waffle-like pattern of longitudinal and transverse linear indentations 67, 68 is formed in reflective portion 58, the pattern being substantially square at either end but elongated in a longitudinal direction at the middle. Transverse grooves 64, 65 are formed in a retro-reflective portion 59 at either end of the reflective portion 58. For visibility transverse grooves 69 are formed at each end in the ramp portion of the retro-reflective section.

On the double wedge 51, the length is six inches and the width is four inches. The radius at corners 52 is .875". The length of the glossy surface 58 is 4.75 and the radius at the corners 61 of the glossy part is .750. The height of the wedge is .650 at the maximum 71. The height at the top of the bead portion 59 is .350.

FIGS. 23 and 24 show a further variation of the marker wherein only the top portion of the marker shown in FIGS. 19 to 22 is used. This form of the invention is particularly useful because of its low profile in areas over which snow plows operate. The blade of a plow is less likely to catch the marker and scrape it off the pavement where the shape of FIGS. 23 to 24 is used. A full description of the shape of the marker is not believed necessary and the same reference numerals as those used in FIGS. 19 to 22 are repeated to refer to corresponding parts, said numerals followed by the subscript *a*.

*Method*

In practicing the method hereinafter described in detail, a "panning table" is preferably used having a number of molds mounted on a tray, the molds being complementary to the marker. Said table is described in detail by co-pending application Serial No. 135,668, and is not herein described in detail. It is sufficient to state that the table imparts a motion to each mold which improves the characteristics of the product. This motion is similar to that imparted to minerals in panning for gold.

The action of the panning table is such that each mold describes a circular path of small diameter of the general range of .020 to .25 inch in a horizontal plane, with the result that the contents of each mold receives a uniform panning action. The panning action completely fills the mold and also insures that the glass spheres which are used in the retro-reflective portion of the marker are uniformly distributed. The panning action also accomplishes a rapid leveling of the contents of all molds when the resinous mass is quite viscous.

Although the material used in practicing the method is subject to considerable variation, nevertheless a preferred material and method of compounding same is hereinafter described. The characteristic of the thermo-setting type resin is subject to considerable variation. For utmost tensile strength, elongation, etc. there is a maximum of resinous binder. For strong color there is a practical minimum of pigment. For optimum reflectance there must be a maximum amount of exposed glass spheres. Practical balance of major components for a 100-pound batch molding material requires:

| | Pounds |
|---|---|
| Isophthalic polyester resin | 20 |
| Finely ground pigment | 5 |
| Clean glass spheres | 70 |

Foregoing quantities, plus 5%, minus 0%.

The above batch is processed and partially cured, as per the below step-by-step method, at which time from 1.0% to 3.0% of either glass spheres or round silica particles is added by sprinkling over the top of the mold (bottom 12 of the button being molded) to construct the roughened bottom surface.

The isophthalic polyester resin may be Reichold Chemicals, Inc. Polylite 31–830. The characteristics of this product are as follows:

| | |
|---|---|
| Viscosity, Brookfield, 77° F., cps. | 600–900 |
| Specific gravity | 1.14–1.15 |
| Weight per gallon, pounds | 9.56 |
| Percent polymerizable | 100 |
| Color APHA | 300–500 |
| SPI gel test: [1] | |
| Gel time, minutes | 4–5 |
| Cure time, minutes | 7–8 |
| Peak exotherm temperature, ° F. | 305–325 |

[1] 3″ depth of resin in 19 x 150 mm. test tube immersed in 180° F. water bath. Resin catalyzed with 1% benzoyl peroxide.

A suitable peroxide catalyst for the above resin is between .05% and 2.0% of 60% methyl ethyl ketone peroxide and a promoter of between 0.30% and 0.75 of 6% cobalt naphthenate or equivalent. Curing at these proportions is best carried out at from 100° to 200° F. for three to five minutes.

Pigment suitable for white markers may be finely ground $TiO_2$ of a size of about 0.3 micron.

The method employs the following steps:

Step 1.—18 lbs. titanium dioxide ($TiO_2$) finely ground to a particle size of about .3 micron is thoroughly ground or milled, until thoroughly dispersed in 18 lbs. of polyester resin.

Step 2.—About ½ lb. of 6% cobalt naphthenate is blended into 54 lbs. of polyester resin, using a conventional blender.

Step 3.—36 lbs. of the pigmented white paste produced by step 1 is combined with the 54 lbs. of cobalted resin produced by step 2, and thoroughly blended together by mechanical mixing. When this mass is homogeneous, an amount of catalyst such as methyl ethyl ketone peroxide is added and quickly and thoroughly mixed into the mass. The amount of catalyst added varies from about 30 cc. to about 100 cc., depending upon the ambient temperature at time of mixing. This amount of catalyst is a carefully controlled variable which is adjusted for each type of button being made, so that the cure time will be correct for button size and curing conditions.

Step 4.—200 lbs. of clear glass spheres of the type used for dropping on paint stripping on roadways to make them reflective, is dispersed into the catalyzed resin mixture by mechanical mixer and prepared for the mold-filling operation immediately following. In a preferred form of the invention the glass spheres are of two sizes mixed between 60% and 40% by volume. The larger spheres are preferably in the range 500 microns or larger and the smaller in the range of 20 microns or less. Preferably the larger spheres are at least 10 times the size of the smaller.

Step 5.—A second batch of catalyzed resin mixture is prepared in accordance with step 3, but no glass spheres are mixed with this material. This second batch is for the reflective part of the marker.

Step 6.—Molds in a tray are already at hand, the molds being complementary to the markers to be produced. A blended mass formed in accordance with step 5 is served into the individual mold cavity by means of a hand dipper of the type commonly used for ice cream, or by automatic or other suitable means. The scoop is first loaded and then levelled off at the top so that the correct amount of blended mass is dropped into the mold. The amount filled into the mold is only sufficient to fill the inverted mold to the level of the reflective material. Following this first filling, the molds and contents are panned on a panning table and then allowed to set until the beginning of "gel," at which time there is a second filling in similar manner of material compounded in accordance with step 4. The quantity filled the second time is sufficient to fill the mold. Thereafter, panning is continued. Each tray of molds is removed from the panning table as soon as the material in the molds is settled and levelled and the tray is then placed on a conveyor which carries the loaded tray to the next operation. As soon as one tray of molds is completed and transferred, another layer is fixed upon the panning table and the filling cycle repeated.

Step 7.—As soon as the resinous mass in molds starts to "gel," glass spheres or various silicas or similar material are sprinkled onto the bottoms of the molded pieces. Sufficient of this is sifted on to insure that, as some spheres are settled into the uncured resinous layer present over the tops of the curing buttons, there will be an ample quantity of the spheres exposed so that there will be no area of resin without glass or silica after the button completely cures.

Step 8.—Trays received from step 7 are placed on a continuous conveyor which conveys them through a baking oven with very accurate thermostatic controls. The conveyor runs the length of this oven carrying stacks of trays and the molds thereon. Average sized markers, made of the formulation shown above, require a full hour of post-curing treatment at a temperature of 200° F. for complete curing of the buttons so that they will have the high-strength characteristics required.

Step 9.—At the end of the oven, trays are removed from the conveyor and the molds are emptied of the cured buttons and the excess glass, silica and the like is salvaged. The emptied molds continue along the conveyor to be ready for the beginning of a new molding cycle at step 5.

Step 10.—The markers produced in step 9 are stripped. In this step preferred equipment is a tank of methylene chloride. The molds are set on racks which slide on tilted glides to take the buttons into the bath. The length of time in the bath may vary from about 60 to 180 seconds, depending upon the type of finish desired on the buttons. If an extremely coarse finish is desired the bath is continued for 180 seconds. When polyester resin-cured is immersed in methylene chloride the resin absorbs the methylene chloride at the surface, causing the resin to increase in volume, or swell. This reaction, upon the thin films of cured resin covering the individual glass spheres causes the film to burst, causing surfaces of glass-containing buttons to take on a "feathery" or "snow-flake" texture. The smaller glass particles are interspersed between the larger spheres 21 and hence the spheres are held apart by the smaller ones. The stripping agent undermines the sockets for the smaller particles, thereby facilitating their later removal. At the same time, the penetration of the stripping agent is slowed and kept adjacent the surface.

*Step 11.*—This step recovers the solvent and completes stripping. Preferred equipment is a closed, low-topped cavern where air and methylene chloride vapor are trapped without turbulence. The vapor is in contact with the markers and allows the surfaces to uniformly "feather." This economizes on methylene chloride and makes full use of the vapors. The recovery procedure is terminated to prevent over-reaction from the treatment.

*Step 12.*—Cleaning of the surface of the markers. Equipment may consist of an arrangement of brushes and/or air jets which mechanically or pneumatically remove the fluffy surface cover of the treated buttons. Because methylene chloride is so volatile and reactive, it is important that the fluffy cover be removed as quickly as possible after the buttons come out of the vapor soak, step 11, and that the fluffy cover be removed to expose the underneath surface (glass bead surfaces) to quick evaporation of residual methylene chloride. The brushing operation has to be a "gentle" action so as not to tear glass spheres out of sockets or crack and weaken the resinous margins around the spheres. For this reason, non-metallic brushes are employed or air jets. When the marker is cleaned, the top two or three layers of small glass particles are removed because the stripping agent has dissolved the resin-surrounding them. This exposes the larger spheres at the surface, without undermining such spheres. When the markers are installed in place this effect is beneficial, particularly at low angles of visibility, because of the fact that the spheres stand out from the surrounding matrix.

Subsequently, the markers 11, 51 are inspected and if necessary re-stripped by repeating steps 10 to 12. The completed markers are stored, packaged and shipped.

It will be understood that the traffic markers may be pigmented with color, such as the orange color frequently used on interstate highways.

*Applying the markers*

In use on the highway, the markers 11 are positioned with the wedge sloping toward the approaching traffic, as in FIG. 15. Preferably, the markers are laid in a line spaced apart about three feet. An interrupted line may be obtained by positioning three markers at three-foot intervals, then skipping about five or six feet and applying three additional markers at three-foot intervals. Double markers 51 are placed along a centerline when cars approach from opposite directions.

If applied to old pavement, the surface must be free of oil and grease and may be prepared by light sandblasting or wire brushing. A detergent, such as Triton X–100 (Rohm and Haas), may be used followed by rinsing with water. New concrete is best cleaned by sandblast, and curing agent may be removed by hydrochloric acid applied with a brush, then rinsed with water.

A standard epoxy adhesive may be used, the two parts of the mixture are mixed together in full amounts with a spatula and used promptly after mixing.

The adhesive may be applied either to the pavement or to the marker. The marker is dropped in place and pressed down gradually and carefully with the foot until a bead of adhesive forms around the edges of the mark, this bead preferably about one inch wide. After the adhesive has set, the mark will remain in place permanently.

Although the foregoing invention has been described in some detail, by way of illustrated and example for purposes of clarity of understanding, it is understood that certain changes and modifications may be practiced within the spirit of the invention and scope of the appended claims.

What is claimed is:

1. A traffic marker comprising a unitary piece of tough, hard plastic, wherein the bottom surface is substantially flat and roughened and the top surface is a surface of revolution of elliptical cross-section wherein, in areas in which a tangent drawn thereto makes an angle to the general perpendicular of less than 109°, said top surface is formed with shallow indentations in patterns providing reflective surfaces, said indentations being in a waffle pattern, said marker divided into two zones along a substantially horizontal plane, one being reflective and the other retro-reflective, said waffle pattern formed in the upper zone.

2. A marker according to claim 1, in which the lower zone is retro-reflective.

3. A marker according to claim 1, in which said marker is elongated and wedge shaped and the upper zone is reflective, hard and dense, said upper zone displaced toward the thicker end of the wedge and having a slightly lesser width than said marker, said marker having a ramp-like top surface between the thin end of the marker and the adjacent end of said upper zone, said ramp-like surface formed with transverse grooves.

4. A marker according to claim 1, divided into two zones along a substantially horizontal plane, the upper zone being reflective and the lower zone retro-reflective, said indentations formed in the upper zone in a waffle pattern, said marker shaped as a double wedge in side elevation.

5. A marker according to claim 4, in which said marker is elongated and wedge-shaped and in which said upper zone is dense and hard, said upper zone being central of said marker and having ramp-like surfaces between the ends of said marker and the adjacent ends of said upper zone, said ramp-like surfaces formed with transverse grooves.

6. A traffic marker comprising a unitary piece of tough, hard plastic, wherein the bottom surface is substantially flat and roughened and the top surface is curved, and comprising a mixture of opaque reflective granules and transparent retro-reflective granules exposed at the surface to provide retro-reflectivity in the case of the transparent granules and reflectivity in the case of the opaque granules, said opaque and transparent granules being thoroughly and uniformly dispersed throughout said marker.

References Cited by the Examiner

UNITED STATES PATENTS

| | | | |
|---|---|---|---|
| Re. 16,035 | 3/1925 | Temple | 94—1.5 |
| 1,746,312 | 2/1930 | Lee | 94—1.5 |
| 1,789,525 | 1/1931 | Hoff | 94—1.5 |
| 1,850,173 | 3/1932 | Horni | 94—1.5 |
| 2,256,636 | 9/1941 | Abbott | 94—1.5 |
| 2,304,345 | 12/1942 | Elliott | 94—1.5 |
| 2,321,476 | 6/1943 | Foster | 94—1.5 |
| 2,666,373 | 1/1954 | Mattson | 94—1.5 |
| 2,897,733 | 8/1959 | Shuger | 94—1.5 |

CHARLES E. O'CONNELL, *Primary Examiner.*

JACOB L. NACKENOFF, *Examiner.*